(12) United States Patent
Wang et al.

(10) Patent No.: US 7,787,522 B2
(45) Date of Patent: Aug. 31, 2010

(54) JOINT MULTI-CODE DETECTORS IN CDMA COMMUNICATIONS SYSTEM

(75) Inventors: Yi-Pin Eric Wang, Cary, NC (US);
Jung-Fu Cheng, Cary, NC (US);
Stephen Grant, Cary, NC (US);
Gregory Edward Bottomley, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1507 days.

(21) Appl. No.: 10/412,504

(22) Filed: Apr. 11, 2003

(65) Prior Publication Data
US 2004/0202231 A1    Oct. 14, 2004

(51) Int. Cl.
*H04B 1/00*  (2006.01)
(52) U.S. Cl. ............... 375/150; 375/142; 375/144; 375/148; 375/340
(58) Field of Classification Search ............... 375/142, 375/144, 147, 148, 150, 340, 341
See application file for complete search history.

(56) References Cited

U.S. PATENT DOCUMENTS

| | | | |
|---|---|---|---|
| 5,724,378 A * | 3/1998 | Miki et al. | 375/148 |
| 6,363,104 B1 | 3/2002 | Bottomley | |
| 6,597,743 B1 * | 7/2003 | Khayrallah et al. | 375/265 |
| 6,654,365 B1 * | 11/2003 | Sylvester et al. | 370/342 |
| 6,829,313 B1 * | 12/2004 | Xu | 375/341 |
| 6,985,518 B2 * | 1/2006 | Nielsen | 375/152 |
| 7,035,317 B2 * | 4/2006 | Elezabi et al. | 375/148 |
| 7,058,116 B2 * | 6/2006 | Moshavi et al. | 375/148 |
| 2002/0080863 A1 | 6/2002 | Nielsen | |
| 2002/0141486 A1 | 10/2002 | Bottomley et al. | |
| 2003/0179814 A1 * | 9/2003 | Juntti et al. | 375/148 |

FOREIGN PATENT DOCUMENTS

| | | |
|---|---|---|
| CN | 1163024 | 10/1997 |
| CN | 1398053 | 2/2003 |

(Continued)

OTHER PUBLICATIONS

G. Ungerboeck, "Adaptive maximum likelihood receiver for carrier modulated data-transmission systems," *IEEE Trans. Commun.*, vol. COM-22, No. 5, pp. 624-635, May 1974.

(Continued)

*Primary Examiner*—David B Lugo
(74) *Attorney, Agent, or Firm*—Coats & Bennett, P.L.L.C.

(57) ABSTRACT

A CDMA communication system uses a RAKE receiver, a code correlator and a multi-code joint detector to jointly detect symbols in two or more received signals contained within a composite signal. The RAKE receiver separates the composite signal into two or more RAKE output signals by despreading the composite signal using selected spreading codes. The multi-code joint detector jointly detects the symbols in the received signals using the RAKE receiver output signals, cross-correlations between the spreading codes generated by the code correlator, and RAKE combining weights based on a noise covariance matrix. The multi-code joint detector also includes a trellis that represents possible states and state transitions and a branch metric calculator for calculating branch metrics associated with the state transitions based on the RAKE receiver output signals and the cross-correlations between the spreading codes.

32 Claims, 7 Drawing Sheets

FOREIGN PATENT DOCUMENTS

| EP | 0978951 A | 2/2000 |
|---|---|---|
| WO | WO 01/01595 A | 1/2001 |

OTHER PUBLICATIONS

A. Duel-Hallen and C. Heegard, "Delayed decision-feedback sequence estimation" *IEEE Trans. Commun.*, vol. 37, No. 5, pp. 428-436. May 1989.

M.V. Eyuboglu and S.U.H. Qureshi, "Reduced-state sequence estimation with set partitioning and decision feedback", *IEEE Trans. Commun.*, vol. 36, No. 1, pp. 13-20, Jan. 1988.

G. E. Bottomley, T. Ottosson, and Y.-P. E. Wang, "A generalized RAKE receiver for interference suppression," *IEEE J. Select Areas Commun.*, vol. 18, No. 8, pp. 1536-1545, Aug. 2000.

L. R. Bahl, J. Cocke, F. Jelinek, and J. Raviv, "Optimal decoding of linear codes for minimizing symbol error rate," *IEEE Trans. Inform. Theory*, vol. 20, pp. 284-287, Mar. 1974.

M.J. Gertsman, J.H. Lodge, "Symbol-by-symbol MAP demodulation of CPM and PSK signals on Rayleigh flat-fading channels," *IEEE Trans. Commun.*, vol. 45, No. 7, pp. 788-799, Jul. 1997.

Y.-P. E. Wang and G.E. Bottomley, "Generalized RAKE reception for cancelling interference from multiple base stations," in *Proc. IEEE Veh. Technol. Conf.*, Boston, Sep. 24-28, 2000.

R.J. McEliece, D.J.C. MacKay, and J.-F. Cheng, "Turbo decoding as an instance of Pearl's 'belief propagation' algorithm," *IEEE J. Sel. Areas Commun.*, vol. 16, No. 2, pp. 140-152, Feb. 1988.

S. Parkvall, J. Peisa, A. Furuskär, M. Samuelsson, and M. Persson, "Evolving WCDMA for improved high speed mobile Internet," *Proc. Future Telecom. Conf.*, 2001, Beijing, China, Nov. 28-30, 2001.

S. Parkvall, E. Dahlman, P. Frenger, P. Beming, and M. Persson, "The evolution of WCDMA toward higher speed downlink packet data access," *Proc. IEEE Veh. Technol. Conf.*, Rhodes, Greece, May 6-9, 2001.

Xiaodong Wang and H. Vincent Poor, "Iterative (Turbo) soft interference cancellation and decoding for coded CDMA," *IEEE Trans. on Com.*, vol. 47, No. 7, pp. 1046-1061, Jul. 1999.

H. Vincent Poor and Sergio Verdu, "Single-user detectors for multiuser channels," *IEEE Trans. on Com.*, vol. 36, No. 1, pp. 50-60, Jan. 1988.

Y.-P. E. Wang, T. Ottosson, and G.E. Bottomley, "RAKE combining methods and apparatus using weighting factors derived from knowledge of spread spectrum signal characteristics," U.S. Appl. No. 09/344,899, filed Jun. 25, 1999.

G.E. Bottomley, Y.-P.E. Wang, and T. Ottosson, "Multi-stage RAKE combining methods and apparatus," U.S. Appl. No. 09/344,898, filed Jun. 25, 1999.

T. Ottosson, Y.-P.E. Wang, and G.E. Bottomley, "Apparatus and methods for selective correlation timing in RAKE receivers," U.S. Appl. No. 09/420,957, filed Oct. 19, 1999.

Siala et al., "Maximum A Posteriori Multipath Fading Channel Estimation for CDMA Systems," Vehicular Technology Conference, 1999 IEE 49$^{th}$ Houston, TX, USA, May 16, 1999, pp. 1121-1125.

Lagunas, Miguel A., Vidal, Joseph, and Perez-Neira, Anna I. "Joint Array Combining and MLSE for Single-User Receivers in Multipath Gaussian Multiuser Channels" IEEE Journal on Selected Areas in Communication. vol. 18, No. 11, Nov. 2000.

Tantikovit, S. and Sheikh, A. U. H. "Joint Multipath Diversity Combining and MLSE Equalization (Rake-MLSE Receiver) for WCDMA Systems" WISR Center, Dept. of Electronic and Information Engineering. The Hong Kong Polytechnic University, Hung Hom, Kowloon, Hong Kong. Department of Electrical Engineering, King Fahd University of Petroleum and Minerals, KFUPM Box 5038, Dhahran 31261, Saudi Arabia, IEEE Vehicular Technology Conference Proceedings, May 2000.

Tang, Kai, Milstein, Laurence B. and Siegel, Paul H. "MLSE Receiver for Direct-Sequence Spread-Spectrum Systems on a Multipath Fading Channel" IEEE Transactions on Communications. vol. 51, No. 7, Jul. 2003.

\* cited by examiner

US 7,787,522 B2

JOINT MULTI-CODE DETECTORS IN CDMA COMMUNICATIONS SYSTEM

FIELD OF THE INVENTION

The present invention generally relates to wireless communication systems and more particularly to joint multi-code detectors in code division multiple access (CDMA) communication systems.

BACKGROUND OF THE INVENTION

One important feature of third generation cellular systems is to provide services over a wide range of data rates. In IS-2000 and wideband CDMA (WCDMA), service bearers of various data rates are achieved by using a combination of multi-code, multi-carrier, and/or multi-spreading factor. For example, in WCDMA, the spreading factors of physical channels vary from 256 to 4, corresponding to 15K symbols per second to 0.96 M symbols per second gross data rate. If multi-code is used with spreading factor 4 and quadrature phase shift keying (QPSK) modulation, a gross data rate higher than 2 M bits per second (bps) can be obtained.

However, in such a scenario, the conventionally used RAKE receiver does not perform well in a dispersive channel. This is because the processing gain, provided through signal spreading, is not high enough to reject inter-symbol interference (ISI) due to multipath. The ISI can come from adjacent symbols on the same code, or from overlapping symbols on other codes. As a result, user throughput and coverage are limited by multipath delay spread. As high-speed data communications become more and more important for future applications, it is critical to address this ISI problem when multi-code is used along with a low spreading factor, to guarantee adequate receiver performance even in dispersive channels.

In U.S. Pat. No. 6,975,672, receivers for detecting a direct-sequence spread spectrum (DS-SS) signal of a very low spreading factor were proposed. First, a maximum likelihood sequence estimator (MLSE) in additive white Gaussian noise (AWGN), which utilizes the Ungerboeck metric, was proposed. That application's proposed receiver structure is similar to one used for a narrow-band signal, except that the receiver parameter was to be recalculated for every symbol, accounting for the symbol-dependent scrambling code typically used in CDMA systems. The complexity of an MLSE receiver grows as the delay spread increases. To make the receiver complexity manageable, sub-optimal receivers, such as the decision feedback sequence estimator (DFSE), decision feedback equalizer (DFE), and reduced-state sequence estimator (RSSE), were introduced. The aforementioned MLSE, DFSE, DFE, and RSSE receiver structures were also extended to address the issue of noise temporal correlation when colored noise is encountered. It was shown that a generalized RAKE (G-RAKE) structure was used when colored noise was encountered.

Prior art receivers generally address single code reception. To maximize data throughput, multi-code may be used along with low spreading factors. Thus, a receiver capable of dealing with multi-code interference is highly desirable. Further, prior art receivers generally do not address the issue of soft value generation. In wireless data communications systems, typically, a forward error correction (FEC) code is used to improve the accuracy of receivers. To maximize the effectiveness of the FEC code, soft values corresponding to the log-likelihood ratio of the encoded bits are needed for the FEC decoder.

SUMMARY OF THE INVENTION

The present invention comprises methods and apparatus for jointly detecting received multi-code signals. An exemplary receiver according to the present invention jointly detects multi-code signals based on the cross-correlations of the multi-code spreading codes and on RAKE combining weights based on a noise covariance matrix.

In an exemplary embodiment, a CDMA communication system jointly detects symbols in two or more received signals contained within a composite signal using a RAKE receiver, a code correlator, and a multi-code joint detector. The RAKE receiver separates the composite signal into two or more RAKE output signals by despreading the composite signal using selected spreading codes. Further, the RAKE receiver generates RAKE combining weights based on a noise covariance matrix. The multi-code joint detector jointly detects the symbols in the received signals using the RAKE receiver output signals, cross-correlations between the spreading codes generated by the code correlator, and RAKE combining weights. Based on the cross-correlations between the spreading codes, a branch metric calculator generates branch metrics associated with the state transitions of the corresponding trellis. The branch metrics obtained according to the present invention can be used in MLSE, DFSE, DFE, or RSSE receivers for multi-code joint detection.

In another exemplary embodiment, branch metrics may be used for generating optimal soft values for the encoded bits to maximize FEC decoder performance. Generating these soft values includes calculating a forward state metric and estimating a backward state metric based on branch metrics. By estimating the backward state metric, the CDMA receiver does not need to implement a backward recursion process, saving processing time and power.

DETAILED DESCRIPTION OF THE INVENTION

Figure 1:
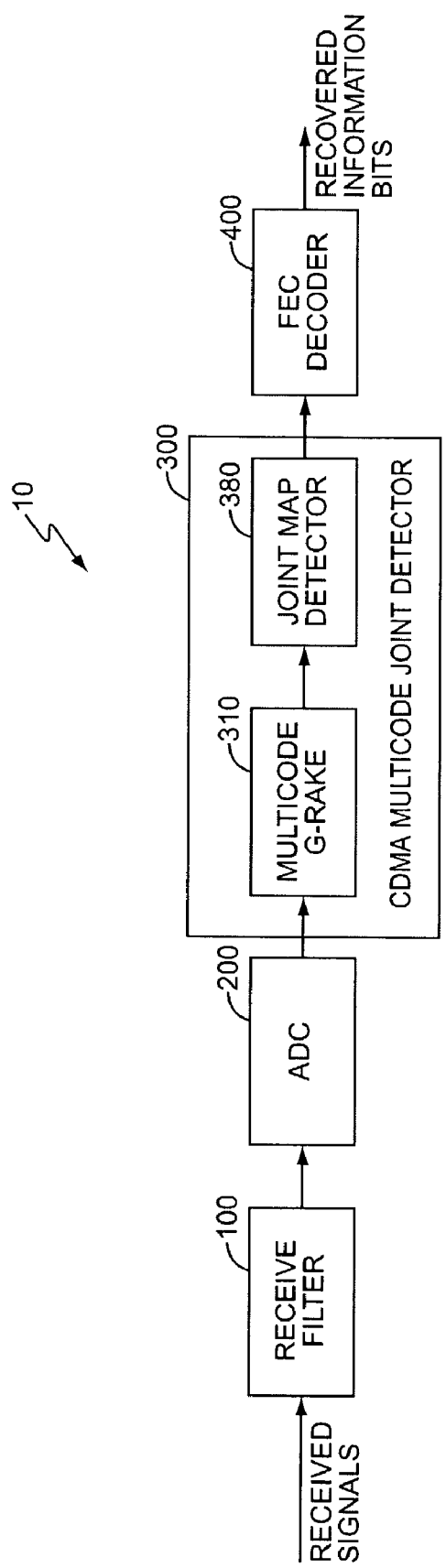
FIG. 1 illustrates a receiver block diagram according to the present invention.

FIG. 1 illustrates a block diagram of a multi-code receiver 10 according to the present invention. Receiver 10 includes receive filter 100, analog-to-digital converter (ADC) 200, CDMA multi-code joint detector 300, and a decoder 400, such as a forward error correcting (FEC) decoder. Receive filter 100, which is typically matched to the chip waveform used at the transmitter, filters a composite received signal. ADC 200 samples and digitizes the receive filter output. The digitized baseband samples then are processed by CDMA multi-code joint detector 300. The multi-code joint detector 300 comprises a RAKE receiver, such as a G-RAKE receiver 310 and a joint detector, such as a joint maximum a posteriori (MAP) detector 380. The G-RAKE receiver 310 separates the composite received signal into two or more RAKE output signals. The joint MAP detector 380 jointly detects the received symbols in the separated G-RAKE output signals and outputs soft values to the decoder 400. Decoder 400, e.g., a convolutional code decoder or a turbo code decoder, processes the soft values from MAP detector 380 to recover the transmitted information bit.

Figure 2:
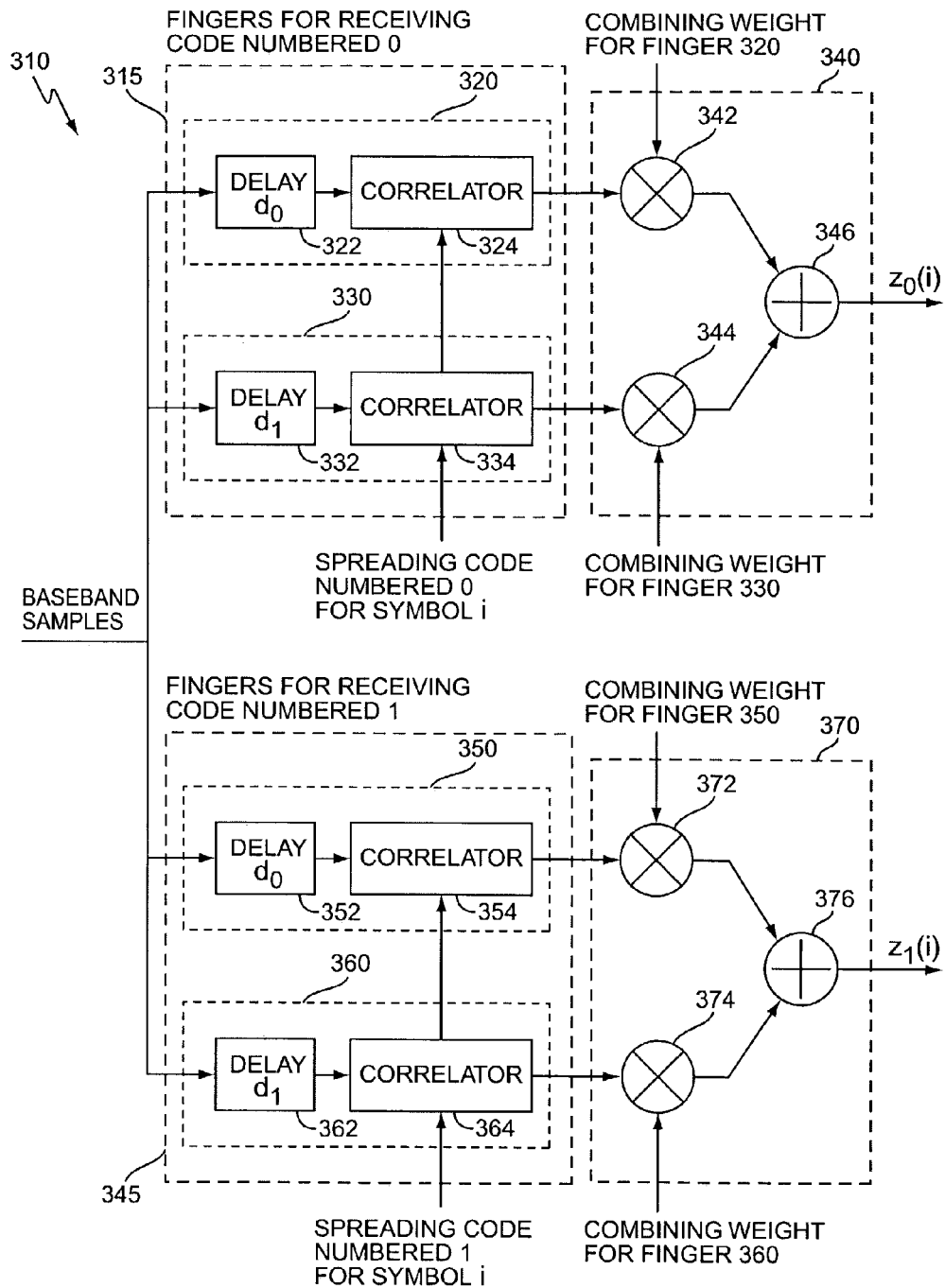
FIG. 2 illustrates a multi-code G-RAKE receiver according to the present invention.

G-RAKE receiver 310 used in CDMA multi-code joint detector 300 has the same general structure as the G-RAKE receiver described in U.S. Pat. No. 6,363,104, U.S. Pat. No. 6,714,585, U.S. Pat. No. 6,801,565, and U.S. Pat. No. 6,683,924, all of which are hereby incorporated by reference. FIG. 2 illustrates an exemplary structure for multi-code G-RAKE receiver 310. For illustration purpose, the diagram is simplified to 2-code reception with two fingers per code. It will be understood by those skilled in the art that the current invention applies to receiving more than two multi-codes and to RAKE receivers with more than two G-RAKE fingers per code.

G-RAKE receiver 310 includes code channel zero receiver 315, code channel one receiver 345, and combiners 340, 370. Code channel zero receiver 315 includes RAKE finger 320 and RAKE finger 330, where each RAKE finger 320, 330 includes delay elements 322, 332 and correlators 324, 334, respectively. Similarly, code channel one receiver 345 includes RAKE finger 350 and RAKE finger 360, where each RAKE finger 350, 360 includes delay elements 352, 362 and correlators 354, 364, respectively. As shown in FIG. 2, RAKE fingers 320, 330 receive the i-th symbol transmitted on code channel zero. Delay elements 322, 332 align the received signal with the spreading sequence used by the symbol of interest (i-th symbol transmitted on code channel zero). Correlators 324, 334 calculate the correlation between the incoming delayed signals and the spreading code numbered zero used by the symbol of interest. Similarly, RAKE fingers 350, 360 receive the i-th symbol transmitted on code channel one. Delay elements 352, 362 align the received signal with the spreading sequence used by the symbol of interest (i-th symbol transmitted on code channel one). Correlators 354, 364 calculate the correlation between the incoming delayed signals and the spreading code numbered one used by the symbol of interest.

Combiner 340 includes multipliers 342, 344 and adder 346. Similarly, combiner 370 includes multipliers 372, 374 and adder 376. Multiplier 342 combines the output from RAKE finger 320 with a combining RAKE weight for finger 320, while multiplier 344 combines the output from RAKE finger 330 with a combining RAKE weight for finger 330. Adder 346 adds the weighted RAKE finger outputs to form a G-RAKE output signal $z_0(i)$ for the i-th symbol received on code channel zero. Similarly, fingers 350, 360 are G-RAKE fingers used to receive the i-th symbol transmitted on code channel one. Multipliers 372, 374 combine the outputs from RAKE fingers 350, 360 with their respective RAKE combining weights. Adder 376 adds the weighted RAKE finger outputs to form a G-RAKE output $z_1(i)$ corresponding to the i-th symbol received on code channel one.

A vector of RAKE combining weights w is determined by both the noise covariance matrix R and the net response h, $w=R^{-1}h$. However, in contrast to the single code G-RAKE receiver proposed in the '672 patent, the noise covariance matrix used here only includes the contribution from thermal noise and multiple-access interference which is not detected in the multi-code joint detector 300.

Figure 3:
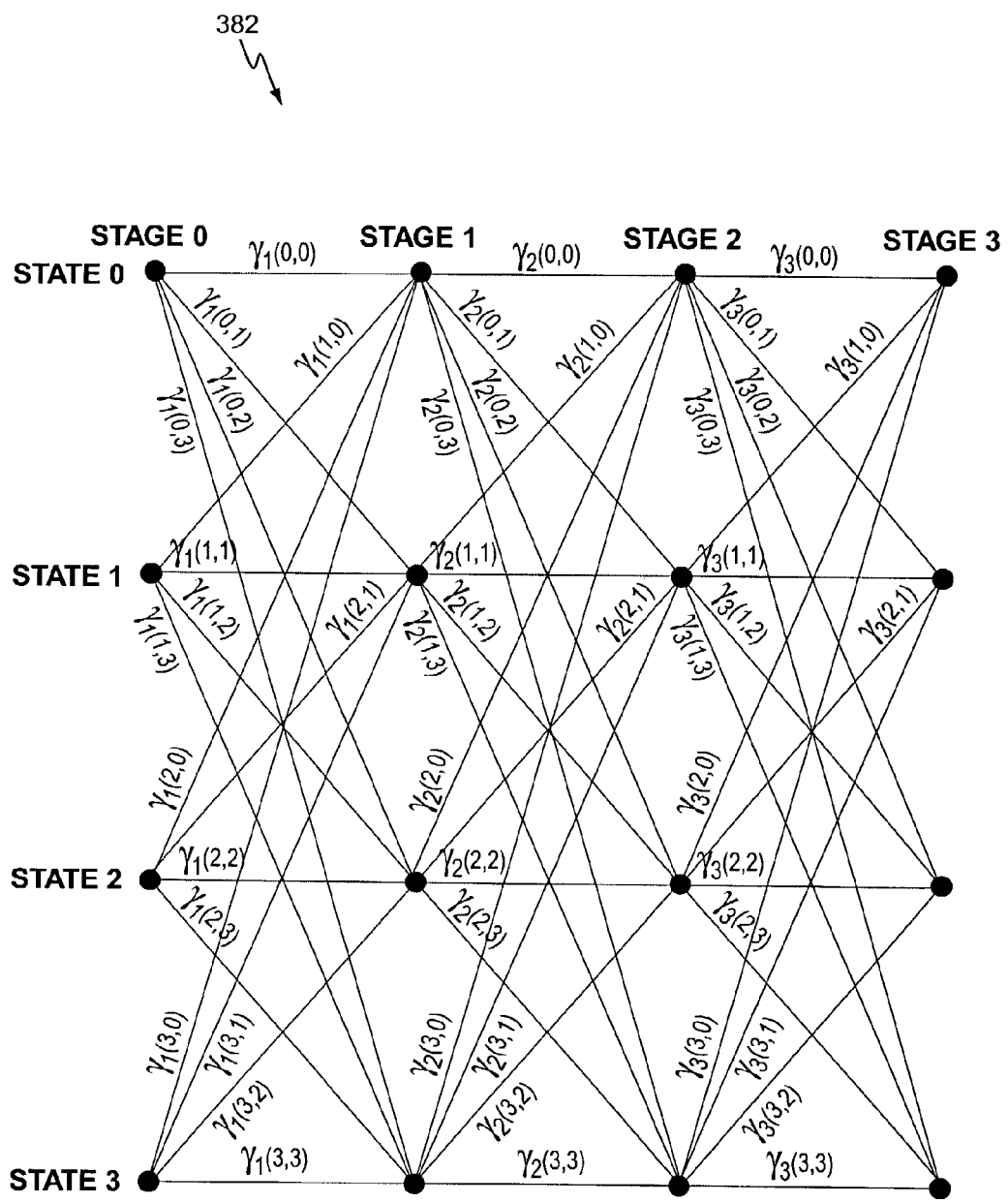
FIG. 3 illustrates a multi-code trellis diagram.

A trellis diagram 382 with state transmissions similar to the one shown in FIG. 3 can be used to represent the multi-code detection problem of the present invention. Here we only show a trellis of 4 stages with 4 states per stage. This trellis can be used to jointly detect two binary phase shift keying (BPSK) symbols. Concatenating two hypothesized BPSK symbols that are to be jointly detected forms the states. For example, state 0 represents the case where both hypothesized symbols are "0"; state 1 represents the case where the hypothesized symbols are "0" and "1," respectively; state 2 represents the case where the hypothesized symbols are "1" and "0," respectively; and state 3 represents the case where both hypothesized symbols are "1." It will be understood by those skilled in the art that a larger trellis may also be used.

Let S(i) be the state at stage i. As illustrated in FIG. 3, for each state transition S(i−1)→S(i), there is a corresponding branch metric $\gamma_i(S(i-1),S(i))$. Based on the modulations and channel memory of the symbols to be jointly detected, the receiver forms a trellis represented by the one shown in FIG. 3. Three key factors are used in forming the trellis: (1) all the possible trellis states, (2) all the valid state transitions between trellis stages, and (3) the number of trellis stages. Basically, forming a trellis means considering different symbol hypotheses and forming metrics associated with the hypotheses.

Figure 4:
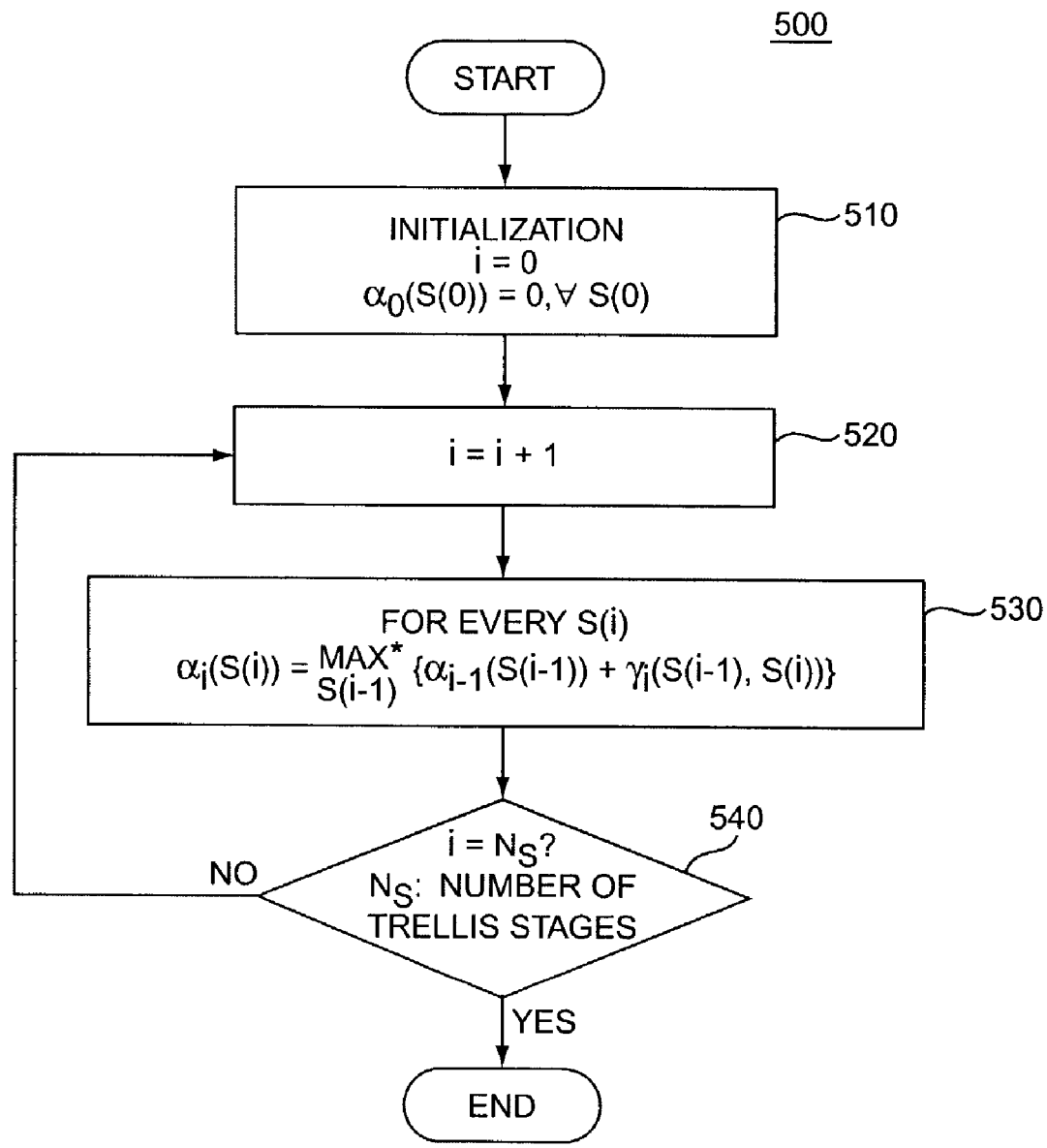
FIG. 4 illustrates a forward recursion procedure.

Joint MAP detector 380 may use a forward and backward recursion process similar to that used in the well known Bahl, Cocke, Jelinek, and Raviv (BCJR) algorithm to compute the soft values associated with the bits being detected. Using the BCJR algorithm, MAP detector 380 computes soft values associated with the bits being detected based on forward and backward state metrics generated during forward and backward recursions through trellis diagram 382. The forward recursion involves recursively obtaining a forward state metric for each state on the trellis 382. Let $\alpha_i(S(i))$ be the forward state metric for state S(i). The forward recursion process 500, illustrated in FIG. 4, starts by initializing the forward state metric to zero at the zeroth stage (block 510). If it is known that a particular state is the true starting state, then $\alpha_0$ for that state can be set to a large positive value to reflect this knowledge. At block 520, index i denoting the trellis stage is incremented by one. For every new stage, the forward state metric is determined based on the forward state metrics of the previous stage and the branch metrics leading into the current state (block 530) according to Equation 1.

$$\alpha_i(S(i)) \triangleq \max_{S(i-1)}{}^* \{\alpha_{i-1}(S(i-1)) + \gamma_i(S(i-1), S(i))\}. \quad (1)$$

In Equation 1, $\alpha_{i-1}(S(i-1))$ represents a forward state metric for the previous stage, while $\gamma_i(S(i-1),S(i))$ represents a branch metric for the transition from state S(i−1) to state S(i). The max * operation is defined as:

$$\max_i{}^* \{x_i\} \triangleq \log\left(\sum_i e^{x_i}\right). \quad (2)$$

This operation can be implemented as the sum of the maximum among $x_i$'s and a correction term, as shown in Equation 3. Usually, it is enough to just use the maximum term to approximate the operation (Equation 3).

$$\max_i{}^* \{x_i\} = \max_i\{x_i\} + f_c(\{x_i\}) \approx \max_i\{x_i\}. \quad (3)$$

Basically, the forward recursion accumulates state metrics to determine the shortest path through the trellis. Steps 520, 530, and 540 are repeated until $\alpha_i(S(i))$ has been calculated for each of the $N_s$ trellis stages.

Figure 5:
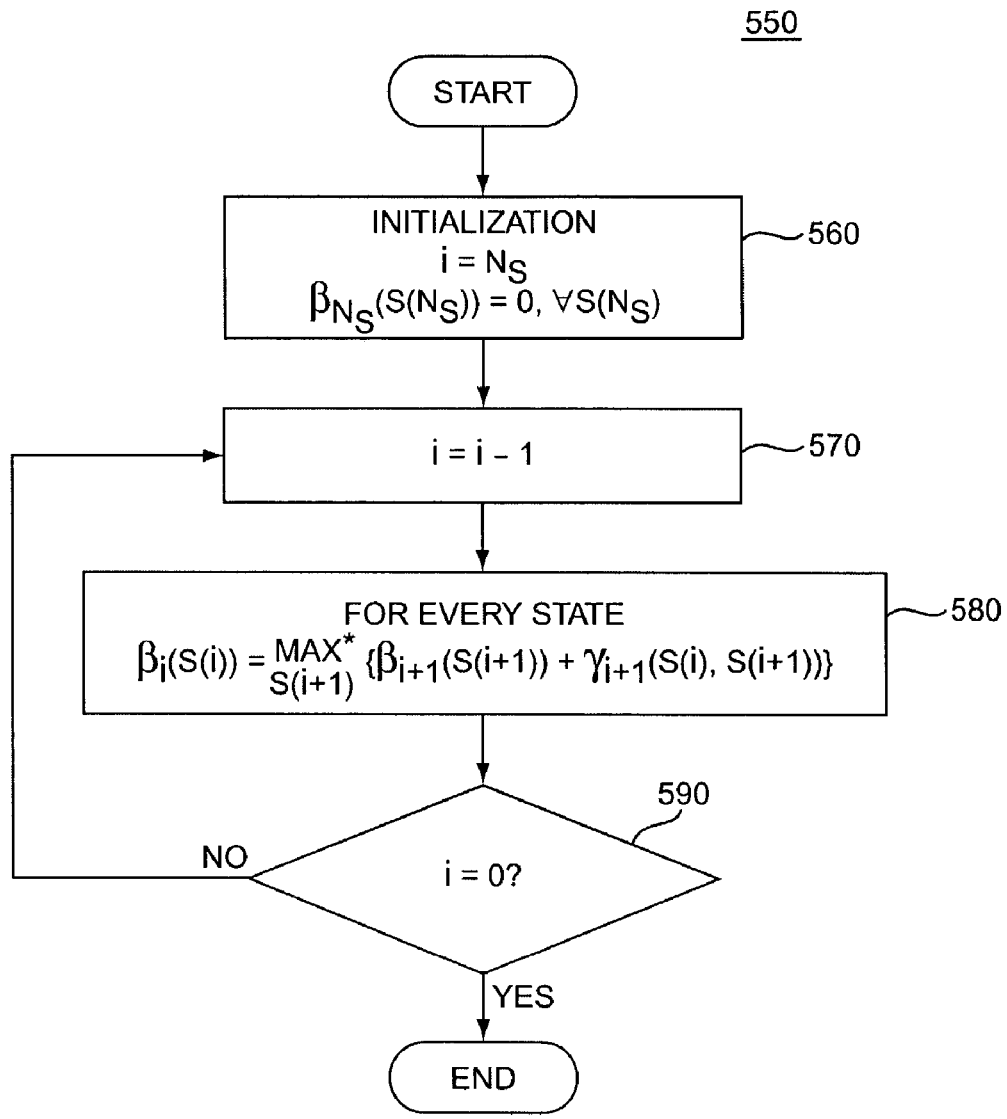
FIG. 5 illustrates a backward recursion procedure.

The backward recursion process 550 is described in FIG. 5, where $\beta_i(S(i))$ is the backward state metric for state $S(i)$. The backward recursion can be initialized by setting the backward state metrics of the last stage to zero for all states (block 560). If it is known that a particular state is the true ending state, then $\beta_{N_s}$ for that state can be set to a large positive value to reflect this knowledge. At step 570, index i denoting the trellis stage is decremented by one. For stages $i=N_s, N_s-1, \ldots, 1$, blocks 570, 580, and 590 update the backward recursion metric according to:

$$\beta_i(S(i)) \stackrel{\Delta}{=} \max_{S(i+1)}{}^* \{\beta_{i+1}(S(i+1)) + \gamma_{i+1}(S(i), S(i+1))\}. \tag{4}$$

In Equation 4, $\beta_{i+1}(S(i+1))$ represents the backward state metric for the next stage, while $\gamma_{i+1}(S(i),S(i+1))$ represents the branch metric for the transition from state $S(i)$ to state $S(i+1)$.

Figure 6:
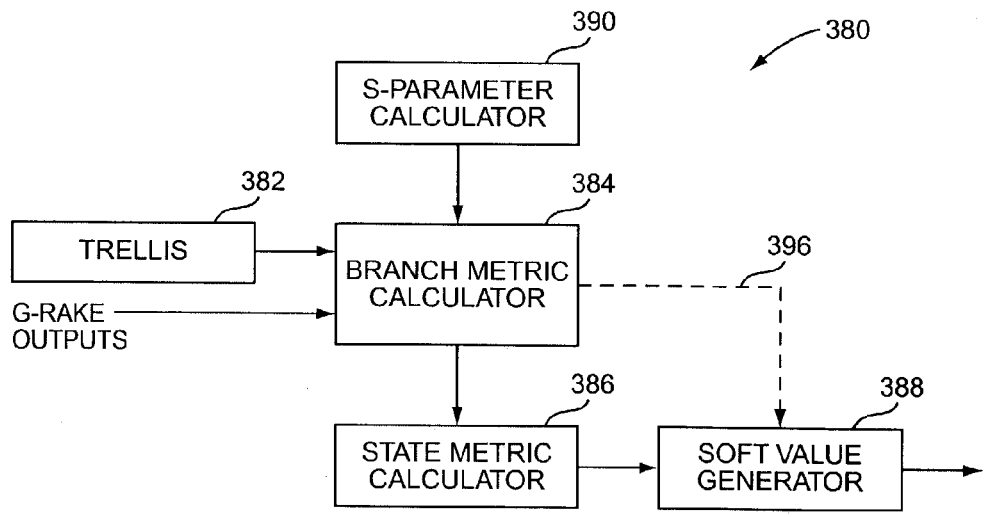
FIG. 6 illustrates an exemplary joint MAP detector according to the present invention.

The present invention employs an inventive branch metric formulation. As illustrated in FIG. 6, MAP detector 380 includes trellis 382, branch metric calculator 384, s-parameter calculator 390, state metric calculator 386, and soft value generator 388. Branch metric calculator 384 generates branch metrics based on outputs from G-RAKE receiver 310, s-parameters generated by s-parameter calculator 390, and hypothesized symbols according to the state transition $S(i-1) \to S(i)$ from trellis 382. State metric calculator 386 computes state metrics during both forward and backward recursions as previously described. The forward state metrics generated during the forward recursion and the backward state metrics generated during the backward recursion are passed to soft value generator 388, which uses the forward and backward state metrics to generate soft values. Alternatively, as discussed below, soft value generator 388 may compute soft values based on forward state metrics from state metric calculator 386 and on reverse branch metrics from branch metric calculator 384 (path 396).

The following describes joint detection of k codes using a trellis with memory depth M, according to the present invention. Let $S(i)$ be the trellis state at time i:

$$S(i)=(\tilde{s}(i),\tilde{s}(i-1),\ldots,\tilde{s}(i-M+1)), \text{where} \tag{5}$$

$$\tilde{s}(i)=(\tilde{s}_0(i),\tilde{s}_1(i),\ldots,\tilde{s}_{k-1}(i))^T \tag{6}$$

is the hypothesized i-th super symbol for the k jointly detected codes, and $\tilde{s}_k(i)$ is the hypothesized i-th transmitted symbol on code k. Note that $\tilde{s}(i)$ can take values on any of the constellation points of trellis 382. If $2^Q$ is the size of the constellation, then the total number of states on the trellis 382 is $|S(i)|=2^{QMk}$.

The branch metric associated with the transition from state $S(i-1)$ to $S(i)$ is given by $$\gamma(S(i-1),S(i)) = \sum_{k=0}^{K-1} \mathrm{Re}\left\{\tilde{s}_k^*(i)\left[2z_k(i) - \sum_{k_2=0}^{K-1} \tilde{s}_{k_2}(i)\phi(k, k_2, i, i) - \right.\right. \tag{7}$$

$$\left.\left. 2\sum_{k_2=0}^{K-1}\sum_{m=1}^{M} \tilde{s}_{k_2}(i-m)\phi(k, k_2, i, i-m)\right]\right\}$$

where $z_k(i)$ is the G-RAKE receiver output for the i-th symbol transmitted on the k-th jointly detected code, and $\Phi(k_1,k_2,i_3,i_2)$ is the s-parameter, as defined below. In Equation 7, $$\sum_{k_2=0}^{K-1} \tilde{s}_{k_2}(i)\phi(k, k_2, i, i) + 2\sum_{k_2=0}^{K-1}\sum_{m=1}^{M} \tilde{s}_{k_2}(i-m)\phi(k, k_2, i, i-m)$$

defines how the multi-code and ISI interferes with $z_k(i)$. As mentioned earlier, the G-RAKE output for the i-th symbol transmitted on the k-th jointly detected code can be expressed as $$z_k(i)=w^H y_k(i) \tag{8}$$

where w is a vector of G-RAKE combining weights and $y_k(i)$ is a vector collecting the despread values of symbol i of the k-th code channel.

Figure 7:
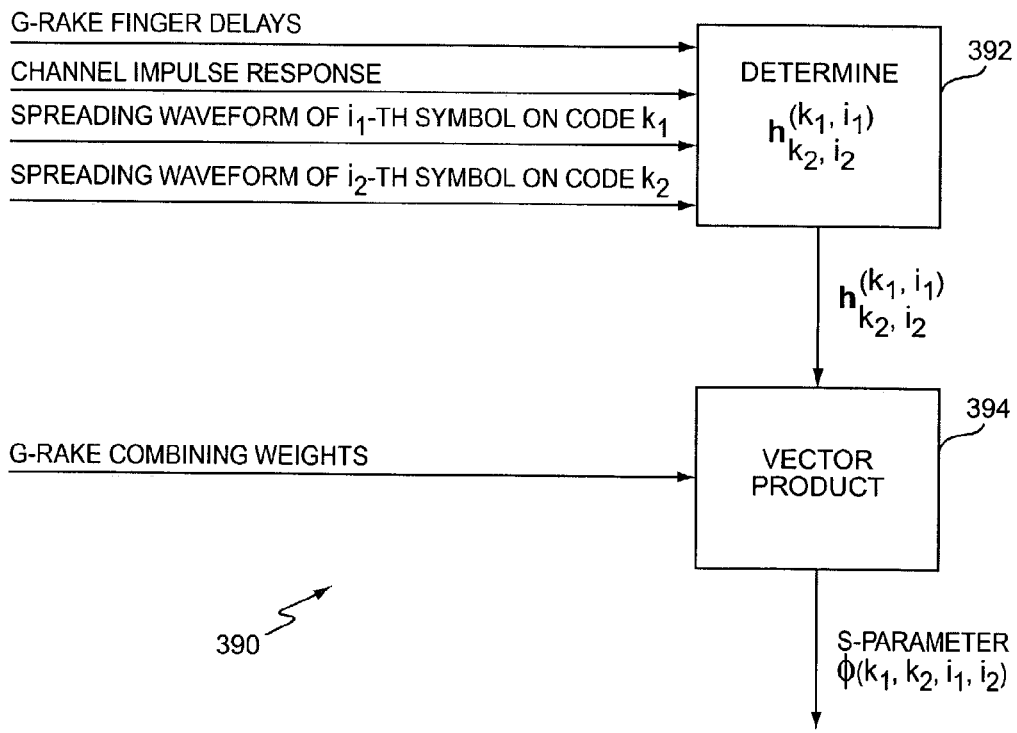
FIG. 7 illustrates an s-parameter calculator according to the present invention.

FIG. 7 illustrates an exemplary s-parameter calculator 390 according to the present invention. S-parameter calculator 390 includes code correlator 392 and vector product calculator 394. As shown in FIG. 7, code correlator 392 generates cross-correlations, which can be viewed as a cross-correlation vector $h_{k_2,i_2}^{(k_1,i_1)}$, where each element of cross-correlation vector $h_{k_2,i_2}^{(k_1,i_1)}$ is based on the correlation between the multi-path channel impulse response (g(t)), the spreading waveform of the $i_1$-th symbol on code $k_1$ ($f_{k_1,i_1}(t)$), and the spreading waveform of the $i_2$-th symbol on code $k_2$ ($f_{k_2,i_2}(t)$) for a given G-RAKE finger delay, d. The impulse response of the multi-path channel can be obtained through estimating the delays and coefficients of the radio channel according to $$g(t) = \sum_{l=0}^{L-1} g_l\delta(t-\tau_l), \tag{9}$$

where L is the number of multi-paths, and $g_l$ and $\tau_l$ are the complex coefficient and delay of the l-th multi-path, respectively. The cross correlation vector can be expressed in a simple mathematical expression as $$h_{k_2,i_2}^{(k_1,i_1)}(d)=f_{k_1,i_1}^*(-t)^*f_{k_2,i_2}(t)^*g(t)|_{t=d+i_1T-i_2T}. \tag{10}$$

For each G-RAKE finger delay (d), Equation 10 convolves the time reverse of the spreading waveform of the $i_1$-th symbol on code $k_1$ with the spreading waveform of the $i_2$-th symbol on code $k_2$ and with the multi-path channel impulse response. Each element $h_{k_2,i_2}^{(k_2,i_2)}(d)$ of cross-correlation vector $h_{k_2,i_2}^{(k_1,i_1)}$ is obtained by evaluating the result at time $t=d+i_1T-i_2T$, which includes the G-RAKE finger delay, d, as well as the relative symbol delay, $i_1T-i_2T$. Thus, the cross-correlation vector is $h_{k_2,i_2}^{(k_1,i_1)}=(h_{k_2,i_2}^{(k_1,i_1)}(d_0), \ldots, h_{k_2,i_2}^{(k_1,i_1)}(d_{j-1}))^T$, where $d_j$ is the j-th finger delay.

Vector product calculator 394 combines the cross-correlation vector with a vector of G-RAKE combining weights to generate the desired s-parameters, as shown in Equation 11.

$$\phi(k_1,k_2,i_1,i_2)=w^H h_{k_2,i_2}^{(k_1,i_1)}. \tag{11}$$

The combination of Equation 11 may also be described as an inner product, which is the sum of products.

The G-RAKE combining weights may be based on a noise covariance matrix for multi-code joint detection over multiple symbols and multiple codes. It can be shown that for a single-code symbol-by-symbol G-RAKE receiver, the noise covariance matrix for the signal of interest can be directly estimated from the code-multiplexed Common Pilot Channel (CPICH) available in IS-95, CDMA2000, and WCDMA. The following describes estimating the noise covariance matrix for multi-code joint detection. The noise component at finger j assigned to code $k_0$ and symbol $i_0$ can be obtained by $$v_{k_0,i_0}(d_j) = y_{k_0,i_0}(d_j) - \sum_{k=0}^{K-1}\sum_{i=0}^{N_s-1}\sum_{l=0}^{L-1}\sum_{m=1-N}^{N-1} \hat{s}_k(i)\hat{g}_l C_{k,i}^{(k_0,i_0)}(m) R_p(d_j + i_0 T - iT - \hat{\tau}_1 + mT_c), \quad (12)$$

where $\hat{g}_l$ and $\hat{\tau}_l$ are the estimated coefficient and delay for the i-th multipath, respectively, $\hat{s}_k(i)$ is the detected symbol value, $R_p(d_j)$ is the auto-correlation function of the chip waveform, and $C_{k,i}^{(k_0,i_0)}(m)$ is the aperiodic cross-correlation function defined as $$C_{k,i}^{(k_0,i_0)}(m) = \begin{cases} \sum_{n=0}^{N-1-m} c_{k,j}(n) c_{k_0,i_0}^*(n+m), & 0 \le m \le N-1 \\ \sum_{n=0}^{N-1+m} c_{k,j}(n-m) c_{k_0,i_0}^*(n), & 1-N \le m \le 0. \end{cases} \quad (13)$$

Generally, Equation 12 subtracts the desired signal, $$\sum_{k=0}^{K-1}\sum_{i=0}^{N_s-1}\sum_{l=0}^{L-1}\sum_{m=1-N}^{N-1} \hat{s}_k(i)\hat{g}_l C_{k,i}^{(k_0,i_0)}(m) R_p(d_j + i_0 T - iT - \hat{\tau}_1 + mT_c),$$

from the output of the j-th finger on symbol $i_0$ code $k_0$, $y_{k_0,i_0}(d_j)$. Here we assume that all the jointly detected channels are of equal power so that they share the same channel coefficients.

The estimated coefficients correspond to the traffic or information bearing signals. Traditionally, radio channel coefficients are estimated using a pilot channel, which gives a scaled version of the radio channel corresponding to the traffic channel. This difference in scaling can be handled by estimating the relative power or voltage levels of the pilot and traffic channels as described in U.S. patent application "Communications Methods, Apparatus, and Computer Program Products Using Gain Multipliers," publication 2003/0092447 Bottomley, et al.

When the pseudo-random scrambling code is averaged out, it can be shown that the noise covariance matrix, shown in Equation 14, is independent of code and time indexes $$R = E_{k,i}[v_{k,i} v_{k,i}^H], \quad (14)$$

where $v = (v(d_0), v(d_1), \ldots, v(d_{J-1}))^T$ and the expectation, E, is taken over all symbols on all the k codes. Note that $v(d_j)$ only includes the contribution due to thermal noise and multiple access interference which is not jointly detected.

For a slow fading channel, the noise covariance can be estimated from the previous receive interval. In this case, $\hat{s}_k(i)$ is readily available. However, for a fast fading channel, the noise covariance matrix may vary quite a lot from one receive interval to the next receive interval. In this case, one can either use the noise covariance estimated in the previous receive interval to get a preliminary estimate of $s_k(i)$, and then update the noise covariance estimate using Equations 12 and 14. Alternatively, one can use a RAKE receiver to obtain the preliminary estimate of $s_k(i)$. Another alternative is to use an explicit form of G-RAKE described in U.S. Pat. No. 6,714,585, "RAKE Combining Methods and Apparatus using Weighting Factors Derived from Knowledge of Spread Spectrum Signal Characteristics," to Wang et al., which is incorporated herein by reference.

The branch metric of Equation 7 can be further simplified by decomposing it into two terms:

$$\gamma_i(S(i-1), S(i)) = 2\sum_{k=0}^{K-1} \text{Re}\{\tilde{s}_k^*(i)(z_k(i) - \sum_{k_2=0}^{K-1}\sum_{m=1}^{M} \tilde{s}_{k_2}(i-m)\phi(k,k_2,i,i-m))\} - \sum_{k=0}^{K-1} \text{Re}\{\tilde{s}_k^*(i)\sum_{k_2=0}^{K-1} \tilde{s}_{k_2}(i)\phi(k,k_2,i,i)\} \quad (15)$$

It is convenient and conceptually helpful to define these two terms. The $$\left(z_k(i) - \sum_{k_2=0}^{K-1}\sum_{m=1}^{M} \tilde{s}_{k_2}(i-m)\phi(k,k_2,i,i-m)\right)$$

term represents a modified G-RAKE combined value for starting state $S(i-1)$, $\tilde{z}_k(S(i-1))$, as shown in Equation 16.

$$\tilde{z}_k(S(i-1)) \triangleq z_k(i) - \sum_{k_2=0}^{K-1}\sum_{m=1}^{M} \tilde{s}_{k_2}(i-m)\phi(k,k_2,i,i-m) \quad (16)$$

The $$\sum_{k=0}^{K-1} \text{Re}\left\{\tilde{s}_k^*(i)\sum_{k_2=0}^{K-1} \tilde{s}_{k_2}(i)\phi(k,k_2,i,i)\right\}$$

term represents a weight energy of the newest hypothesized signal for ending state $S(i)$, $\sigma(S(i))$, as shown in Equation 17.

$$\sigma(S(i)) \triangleq \sum_{k=0}^{K-1} \text{Re}\left\{\tilde{s}_k^*(i)\sum_{k_2=0}^{K-1} \tilde{s}_{k_2}(i)\phi(k,k_2,i,i)\right\} \quad (17)$$

Therefore, branch metric of Equation 7 can be represented as:

$$\gamma_i(S(i-1), S(i)) = \left(2\sum_{k=0}^{K-1} \text{Re}\{\tilde{s}_k^*(i)\tilde{z}_k(S(i-1))\}\right) - \sigma(S(i)). \quad (18)$$

That is, the branch metric is the difference of two terms. In effect, the first term is a correlation between the modified G-RAKE combined value at starting state S(i−1) and the newest hypothesized signal $\tilde{s}_k^*(i)$. The second term is the weighted energy of the newest hypothesized signal for ending state S(i). In the above described implementation, the two terms of Equation 18 can be computed separately. Note that these two terms can be computed, stored, and then re-used multiple times when computing the branch metrics.

As discussed above, wireless data communication systems typically use FEC decoders to improve the accuracy of the receivers. The use of soft inputs, corresponding to the log-likelihood ratio of the encoded bits, generally improves the performance of FEC decoders. Soft input value generation typically uses forward and backward recursion algorithms. However, such backward and forward recursions may introduce undesirable complexity. In addition to the higher computation costs, all of the forward state metrics generated during the forward recursion need to be stored in order to generate the bit soft values when the backward state metrics from the backward recursion are available.

The present invention employs a simplified soft value generation that estimates the backward state metrics based on the branch metrics leading out of the current state of the forward recursion (see FIG. 6, path 396). As a result, the backward state metrics, and therefore the soft input values, are generated as part of the forward recursion process. Therefore, the inventive soft value generation does not require a backward recursion and does not require storing the forward state metrics.

The following describes this process in further detail. Let $\Phi_{kq1}(i)$ be the set of states such that the q-th bit of the k-th symbol of the newest hypothesized symbol $\tilde{s}_k(i)$ is one and let $\Phi_{kq0}(i)$ be the set of states such that the q-th bit of the k-th symbol of the newest hypothesized symbol $\tilde{s}_k(i)$ is zero. The optimal soft value of this bit $b_{kq}(i)$ can be computed as $$SV(b_{kq}(i)) \triangleq \max_{s \in \Phi_{kq1}(i)}{}^* \{\alpha_i(S(i) = s) + \beta_i(S(i) = s)\} - \quad (19)$$
$$\max_{s \in \Phi_{kq0}(i)}{}^* \{\alpha_i(S(i) = s') + \beta_i(S(i) = s')\}$$

We approximate the backward state metric for stage i of Equation 4 in Equation 19 by letting $\beta_{i+1}(S(i+1))=0$, and by replacing $\gamma_{i+1}(S(i),S(i+1))$ with the corresponding terms of Equation 18.

$$\beta_i(S(i)) \approx \max_{S(i+1)}{}^* \left\{-\sigma(S(i+1)) + 2\sum_{k=0}^{K-1} \text{Re}\{\tilde{s}_k^*(i+1)\tilde{z}_k(S(i))\}\right\}. \quad (20)$$

Equation 20 demonstrates how soft values can be computed along side the forward recursion by using the approximation of Equation 20 in Equation 19.

Figure 8:
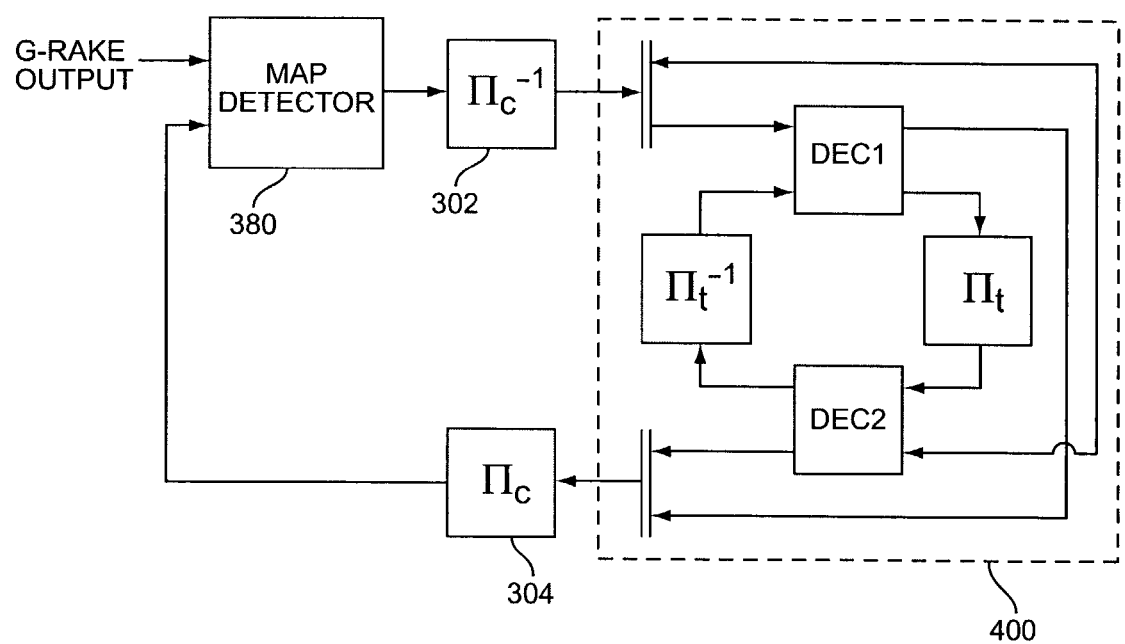
FIG. 8 illustrates a receiver according to the present invention.

According to the present invention, it is possible to improve the system performance by applying iterative decoding techniques such that the joint multi-code detector 300 and the FEC decoder 400 can work together by exchanging soft information. As shown in FIG. 8, the soft values computed by MAP detector 380 are de-interleaved (302) and then used by FEC decoder 400 to compute some a posteriori values and extrinsic values. The extrinsic values are interleaved (304) and fed back to the MAP detector 380, which uses them as a form of a priori values, or prior values, of the signals.

The MAP detector algorithms described above can be easily modified to take advantage of the additional information provided by decoder 400. Let $\mu(b_{kq}(i))$ represent the a priori value of the bit $b_{kq}(i)$. Then the a priori value of a hypothesized symbol $\tilde{s}_k(i)$ may be computed as:

$$\mu(\tilde{s}_k(i)) \triangleq \sum_{q=1}^{Q} b_{kq}(i)\mu(b_{kq}(i)). \quad (21)$$

That is, the symbol a priori value is the sum of the bit a priori values corresponding to the bits being one. For example, the symbols in the QPSK modulation are labeled with two bits: $S_{00}$, $S_{01}$, $S_{10}$, and $S_{11}$. The a priori value of one hypothesized QPSK symbol can be computed as, for the four respective cases, $\mu(\tilde{s}_k(i)=S_{00})=0$, $\mu(\tilde{s}_k(i)=S_{01})=\mu(b_{k2}(i))$, $\mu(\tilde{s}_k(i)=S_{10})=\mu(b_{k1}(i))$, and $\mu(\tilde{s}_k(i)=S_{11})=\mu(b_{k1}(i))+\mu(b_{k2}(i))$.

The recursion algorithms described previously are updated as before, except that the weighted energy (Equation 17) should be replaced by $$\sigma(S(i)) \triangleq \sum_{k=0}^{K-1} \left[\mu(\tilde{s}_k(i)) + \text{Re}\left\{\tilde{s}_k^*(i)\sum_{k_2=0}^{K-1}\tilde{s}_{k_2}(i)\Phi(k, k_2, i, i)\right\}\right]. \quad (22)$$

Furthermore, the soft value output should be modified to be in an extrinsic information form by subtracting out the information the decoder 400 already knows, as shown in Equation 23.

$$SV(b_{kq}(i)) \triangleq \max_{s \in \Phi_{kq1}(i)}{}^* \{\alpha_i(S(i) = s) + \beta_i(S(i) = s)\} - \quad (23)$$
$$\max_{s \in \Phi_{kq0}(i)} \{\alpha_i(S(i) = s') + \beta_i(S(i) = s')\} - \mu(b_{kq}(i))$$

The foregoing description and drawings describe and illustrate the present invention in detail. However, the foregoing disclosure only describes some embodiments. Therefore, the present invention embraces all changes and modifications that come within the meaning and equivalency range of the appended claims.

We claim:
1. A method of processing received signals by jointly detecting symbols in two or more received signals contained within a composite signal, the method comprising:
    separating said composite signal into two or more RAKE receiver output signals by despreading said composite signal in a RAKE receiver using two or more selected spreading codes;
    determining cross-correlations between said two or more spreading codes; and
    jointly detecting received symbols in said received signals by:

generating branch metrics associated with state transitions of a trellis based on said cross-correlations and said RAKE receiver output signals, wherein different state transitions in said trellis correspond to different hypothesized combinations of symbol values;

determining state metrics for states in said trellis based on said branch metrics; and determining said received symbols based on said state metrics.

2. The method of claim 1 wherein jointly detecting received symbols in said received signals comprises jointly detecting received symbols in said received signals with a MAP detector.

3. The method of claim 1 wherein generating branch metrics associated with state transitions of a trellis based on said cross-correlations comprises:

determining an s-parameter by combining said cross-correlations with RAKE combining weights generated by said RAKE receiver; and generating said branch metrics based on said s-parameter and said RAKE receiver output signals.

4. The method of claim 3 wherein determining said s-parameter by combining said cross-correlations with RAKE combining weights generated by said RAKE receiver comprises:

determining products of said RAKE combining weights and said cross-correlations; and summing said products.

5. The method of claim 3 wherein determining said s-parameters is based on determining a noise covariance matrix.

6. The method of claim 5 wherein determining said noise covariance matrix comprises determining RAKE finger noise components over multiple received symbols and multiple codes.

7. The method of claim 3 wherein generating said branch metrics comprises:

determining a modified RAKE receiver output based on said RAKE receiver output signals and said s-parameter;

determining a hypothesized signal;

determining a correlation between said modified RAKE receiver output signals and said hypothesized signal;

determining a weighted energy of said hypothesized signal based on said s-parameter; and generating said branch metrics based on said correlation and said weighted energy.

8. The method of claim 1 further comprising generating soft values for said received symbols.

9. The method of claim 8 wherein generating soft values for said received symbols comprises:

generating forward state metrics for states in said trellis based on branch metrics leading into said states;

selecting reverse branch metrics leading out of said states to use as backward state metrics; and generating soft values for said received symbols based on said forward state metrics and said selected reverse branch metrics.

10. The method of claim 9 further comprising generating said soft values based on prior values of said received symbols.

11. The method of claim 8 wherein determining state metrics for states in said trellis comprises determining forward and reverse state metrics, and wherein generating soft values for said received symbols comprises generating soft values based on the branch metrics, the forward state metrics, and the reverse state metrics.

12. A CDMA communication system for jointly detecting symbols in two or more received signals contained within a composite signal, the system comprising:

a multi-code RAKE receiver for separating said composite signal into two or more RAKE output signals by despreading said composite signal using two or more selected spreading codes;

a code correlator for generating cross-correlations between said two or more spreading codes; and a multi-code joint detector for jointly detecting symbols in said received signals, said joint detector including:

a branch metric calculator for determining branch metrics associated with state transitions in a trellis based on said cross-correlations and said RAKE receiver output signals, wherein different state transitions in said trellis correspond to different hypothesized combinations of symbol values; and a state metric calculator for determining state metrics for states in said trellis based on said branch metrics, wherein said joint symbol detection is based on the state metrics.

13. The system of claim 12 wherein said multi-code joint detector comprises a joint MAP detector.

14. The system of claim 12 further comprising an s-parameter calculator for determining s-parameters by combining a cross-correlation vector of said cross-correlations with a vector of RAKE combining weights generated by said RAKE receiver.

15. The system of claim 14 wherein said branch metric calculator determines said branch metrics based on said s-parameters and said RAKE output signals.

16. The system of claim 14 wherein said s-parameter calculator determines the inner product of said RAKE combining weights and said cross-correlation vector.

17. The system of claim 12 wherein said multi-code joint detector is further configured to generate soft values of said received signals based on a forward state metric and an estimated backward state metric, wherein said forward state metric is based on branch metrics leading into a state and said estimated backward state metric is based on selected branch metrics leading out of said state.

18. The system of claim 17 further comprising a decoder configured to generate prior values of said received signal.

19. A method of generating branch metrics implemented by a multi-code joint detector of a wireless receiver that jointly detects received signals encoded with different spreading codes, the method comprising:

determining cross-correlations between said spreading codes; and generating branch metrics associated with state transitions of a trellis for the multi-code joint detector based on said cross-correlations, wherein different state transitions in said trellis correspond to different hypothesized combinations of symbol values.

20. The method of claim 19 wherein generating branch metrics associated with state transitions of a trellis based on said cross-correlations comprises:

generating RAKE output signals by:

despreading a composite received signal to generate despread signals; and combining said despread signals using RAKE combining weights to generate said RAKE output signals;

determining s-parameters by combining said cross-correlations with said RAKE combining weights; and generating said branch metrics based on said s-parameters and said RAKE output signals.

21. The method of claim 20 wherein determining s-parameters by combining said cross-correlations with said RAKE combining weights comprises:
    determining products of said RAKE combining weights and said cross-correlations; and
    summing said products.

22. The method of claim 20 wherein generating said branch metrics comprises:
    determining modified RAKE output signals based on said RAKE output and said s-parameters;
    determining a hypothesized signal;
    determining a correlation between said modified RAKE output signals and said hypothesized signal;
    determining a weighted energy of said hypothesized signal based on said s-parameters; and
    generating said branch metrics based on said correlation and said weighted energy.

23. The method of claim 19 further comprising using said branch metrics to generate soft values for received symbols in said received signals.

24. The method of claim 23 wherein using said branch metrics to generate soft values for said received symbols comprises:
    generating forward state metrics based on branch metrics leading into a state;
    selecting reverse branch metrics leading out of said state to use as backward state metrics; and
    generating said soft values of said received symbols based on said forward state metrics and said selected reverse branch metrics.

25. The method of claim 23 wherein generating soft values for said received symbols comprises generating soft values based on forward state metrics, reverse state metrics, and the branch metrics.

26. An apparatus for computing branch metrics for use in a joint detector, said apparatus comprising:
    a correlation estimation processor to estimate cross correlations between two or more spreading codes; and
    a branch metric processor for calculating branch metrics associated with state transitions of a trellis for the joint detector based on said cross-correlations between said two or more spreading codes, wherein different state transitions in said trellis correspond to different hypothesized combinations of symbol values.

27. The apparatus of claim 26 wherein said joint detector follows a RAKE receiver for generating RAKE output signals and wherein said apparatus further comprises:
    an s-parameter processor for determining s-parameters by combining said cross-correlations with RAKE combining weights generated by said RAKE receiver, wherein said branch metric processor calculates said branch metrics based on said s-parameters and said RAKE output signals.

28. The apparatus of claim 27 wherein said s-parameter processor determines products of said cross-correlations and said RAKE combining weights.

29. A method of processing received signals by jointly detecting symbols in two or more received signals contained within a composite signal in a multi-code joint detector, the method comprising:
    separating said composite signal into two or more RAKE receiver output signals by despreading said composite signal in a RAKE receiver using two or more selected spreading codes;
    determining cross-correlations between said two or more spreading codes;
    determining RAKE combining weights based on a noise covariance matrix, the noise covariance matrix including contribution from thermal noise and multiple-access interference undetected by the multi-code joint detector;
    jointly detecting received symbols in said received signals based on said RAKE receiver output signals, said cross-correlations, and said RAKE combining weights; and
    decoding the jointly detected symbols to recover a transmitted information bit.

30. The method of claim 29 wherein jointly detecting symbols in said received signals comprises:
    forming a trellis representing possible states and state transitions;
    generating branch metrics associated with said state transitions based on said cross-correlations, said RAKE receiver output signals, and said RAKE combining weights, wherein different state transitions in said trellis correspond to different hypothesized combinations of symbol values; and
    performing a forward recursion through said trellis using said branch metrics to determine state probabilities for states in said trellis.

31. A CDMA communication system for jointly detecting symbols in two or more received signals contained within a composite signal, the system comprising:
    a multi-code RAKE receiver for separating said composite signal into two or more RAKE output signals by despreading said composite signal using two or more selected spreading codes, and for determining RAKE combining weights based on a noise covariance matrix, the covariance matrix including contributions from thermal noise and multiple-access interference undetected during the joint symbol detection;
    a code correlator for generating cross-correlations between said two or more spreading codes;
    a multi-code joint detector for jointly detecting symbols in said received signals based on said RAKE output signals and said RAKE combining weights from said RAKE receiver and said cross-correlations from said code correlator; and
    a decoder for recovering a transmitted information bit based on the jointly detected symbols.

32. The system of claim 31 further comprising a trellis representing possible states and state transitions, wherein said multi-code joint detector comprises a branch metric calculator for determining branch metrics associated with said state transitions based on said cross-correlations, said RAKE receiver output signals, and said RAKE combining weights, wherein different state transitions in said trellis correspond to different hypothesized combinations of symbol values, and wherein said multi-code joint detector performs a forward recursion through said trellis using said branch metrics to determine state probabilities through said trellis.

* * * * *

UNITED STATES PATENT AND TRADEMARK OFFICE
CERTIFICATE OF CORRECTION

PATENT NO. : 7,787,522 B2  
APPLICATION NO. : 10/412504  
DATED : August 31, 2010  
INVENTOR(S) : Wang et al.

Page 1 of 1

It is certified that error appears in the above-identified patent and that said Letters Patent is hereby corrected as shown below:

On the Title page, item (56), under "OTHER PUBLICATIONS", in Column 2, Line 19, delete "IEE" and insert -- IEEE --, therefor.

In Column 6, Line 9, delete "$i_3$," and insert -- $i_1$, --, therefor.

In Column 6, Line 32, delete " $h_{k,i_2}^{(k_1,i_1)}$ ," and insert -- $h_{k_2,i_2}^{(k_1,i_1)}$, --, therefor.

In Column 6, Line 57, delete " $h_{k_2,i_2}^{(k_2,i_2)}$ ," and insert -- $h_{k_2,i_2}^{(k_1,i_1)}$, --, therefor.

In Column 7, Line 17, in Equation (12), delete " $\hat{\tau}_1$ " and insert -- $\hat{\tau}_l$ --, therefor.

In Column 7, Line 39, delete " $\hat{\tau}_1$ " and insert -- $\hat{\tau}_l$ --, therefor.

In Column 7, Line 55-56, delete "publication 2003/0092447 Bottomley, et al." and insert -- publication number 2003/0092447 to Bottomley, et al. --, therefor.

In Column 10, Line 46, in Equation (23), delete "max" and insert -- max* --, therefor.

Signed and Sealed this  
Twenty-second Day of February, 2011

David J. Kappos  
*Director of the United States Patent and Trademark Office*